United States Patent [19]

Hanse

[11] 4,433,915
[45] Feb. 28, 1984

[54] DUAL-POLARIZATION INTERFEROMETER WITH A SINGLE-MODE WAVEGUIDE

[75] Inventor: Joel G. Hanse, Edina, Minn.

[73] Assignee: Honeywell Inc., Minneapolis, Minn.

[21] Appl. No.: 311,584

[22] Filed: Oct. 15, 1981

[51] Int. Cl.³ .............................................. G01C 19/64
[52] U.S. Cl. ..................................... 356/350; 356/351
[58] Field of Search ................................. 356/350, 351

[56] References Cited

FOREIGN PATENT DOCUMENTS 2931443  2/1981  Fed. Rep. of Germany ...... 356/350

Primary Examiner—Vicent P. McGraw
Attorney, Agent, or Firm—Robert A. Pajak

[57] ABSTRACT

A dual polarization interferometer is employed for use as an angular rate sensor. A single waveguide is provided for propagating wave components of each of two polarized waves traveling in opposite directions. Each wave traveling through the waveguide is phase shifted by a value related to the rotation rate of the waveguide.

71 Claims, 4 Drawing Figures

DUAL-POLARIZATION INTERFEROMETER WITH A SINGLE-MODE WAVEGUIDE

The invention herein described was made in the course of or under a contract, or subcontract thereunder, with the Department of the Navy.

The present invention relates to the Sagnac ring interferometer employed as an angular rate sensor. In particular, the waveguide of the interferometer of the present invention simultaneously provides a path for at least two waves of different polarization.

Laser technology in combination with tremendous advances in single-mode optical fibers has made possible the use of a Sagnac ring interferometer employed as a practical angular rate sensor. Note that in the Sagnac interferometer, the waveguide is non-resonant as opposed to those commonly employed in closed-loop path resonant cavity sensors and DILAG laser sensors, each of these sensors utilizing the resonant property of the waveguide for rate determination. The classic Sagnac interferometer employs the use of two waves of the same polarization which counter-propagate (travel in opposite direction within the waveguide) through an open-ended waveguide, once, the waveguide being in the form of a ring or loop or some segment thereof. When the ring is rotated, a phase shift between the two counter-propagating waves is exhibited. In the classic treatment of the Sagnac effect in the ring interferometer rate sensor, the phase shift exhibited between the two counter-propagating waves resulting from rotation thereof is proportional to the rotation rate of the waveguide. The proportionality constant relating the phase shift to rotation is directly related to the area enclosed by the waveguide.

In order to measure the phase difference between the propagating waves in the waveguide and the resultant change in phase difference due to rotation of the ring interferometer, one of the counter-propagating waves can be combined with a reference wave which is unaffected by rotation, or may be combined with the other of the counter-propagating waves, both techniques of measurement are basic and well known measurement techniques for interferometers. The intensity of a pair of combined waves when properly optically combined form an interference fringe pattern which is utilized for deriving information of the resultant change in the phase difference between the counter-propagating waves due to rotation. The intensity of the combined waves is usually proportional to $\cos^2 \Delta\phi$, as is well known, $\Delta\phi$ being the phase difference between the waves.

Note that the type of fringe pattern produced is dependent upon the optical technique of combining the wave. The patterns include, among others, an intensity spot in which the intensity varies as a function of the phase difference between the combined waves.

In a typical ring interferometer utilizing a single photodetector, the sensitivity of the detector to small changes in rotation becomes zero as the rotation rate, $\Omega$, becomes zero. This is so since the counter-propagating waves travel about identical optical paths and the waves add in phase to a maximum intensity value when the interferometer is at rest. Thus, at a maximum or minimum intensity value the rate of change of intensity value at a single detector, for small variations in phase difference between the interfering waves about either the maximum or minimum intensity value, is nearly zero or very low resulting in poor sensitivity to rotation. In the prior art, the problem of low sensitivity in ring interferometer rate sensors is avoided by providing a variable or fixed phase shift through the use of a bias element in the path of the counter-propagating waves to separate the waves in phase so that the waves operate at maximum sensitivity, the maximum sensitivity occurring at the quadrature point, that point being the phase difference between the propagating waves which causes the intensity value to be between minimum and maximum intensity levels. The value of the phase shift produced by the bias element is usually $\pi/4$ for one wave and $\pi/4$ for the opposite traveling wave so that a phase difference of $\pi/2$ is established between the counter-propagating waves to obtain maximum sensitivity.

In such interferometers employing a bias element as just described, large bothersome errors are encountered due to ambient effects, such as temperature, on the bias element resulting in a loss of accuracy. In the present invention, a novel interferometer is described. Further, the novel interferometer in combination with a bias element reduces or eliminates the bothersome error caused by the addition of the bias element and the resulting ambient effects thereof.

SUMMARY OF THE INVENTION

In the present invention, a single waveguide is employed for providing a path for waves of at least two different polarizations. The waves pass through a bias element at least once before impinging upon a detection system. The detection system includes means for operating on detected waves so as to provide phase information of the waves propagating in the waveguide, but which is substantially devoid of the bothersome errors resulting from bias element effects.

DETAILED DESCRIPTION OF THE INVENTION

Figure 1:
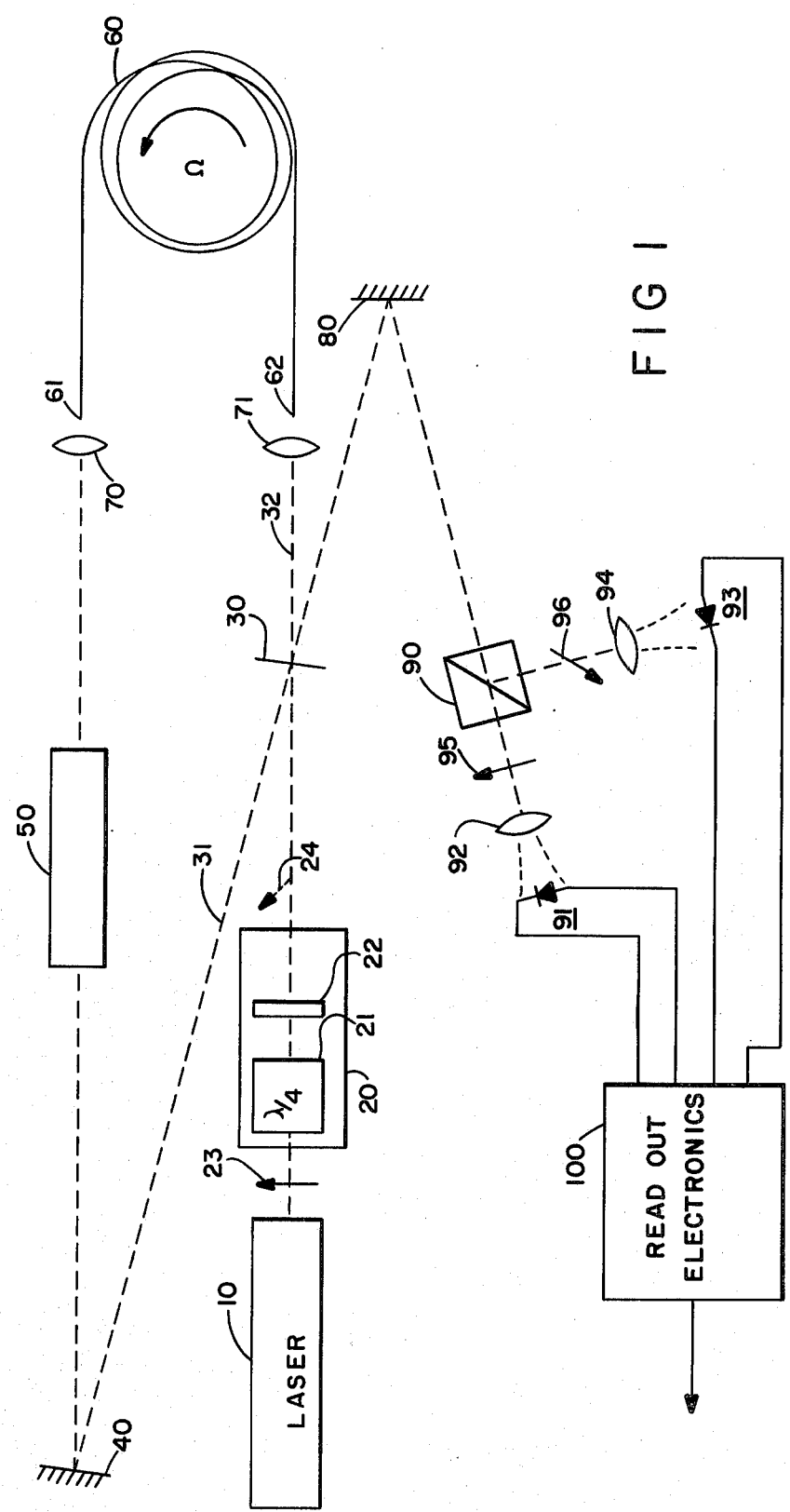
FIG. 1 is a diagrammatic representation of a dual polarization interferometer.

A dual polarization interferometer of the present invention utilized as a rate sensor is shown in FIG. 1. A laser beam source 10 provides a propagating wave toward an optical isolator means 20 which includes quarter wave plate 21 and polarizer 22. Laser source 10 provides a linearly polarized wave indicated by arrow 23. The output wave from optical isolator 20 is also a linearly polarized wave indicated by arrow 24, but which is oriented at an angle with respect to arrow 23. The angle, of course, depends upon the wave indicated by arrow 23 and polarizer 22. The purpose of optical isolator 20 will be further explained below.

The linearly polarized wave indicated by arrow 24 is directed toward beam splitter 30. As is well known in the art, if the incident wave, 24, is properly oriented with respect to the optical axis of the beam splitter, the waves will be separated into linearly polarized S and P polarized waves, these waves being orthogonal to each other. Further, each of these S and P waves will be further divided into "reflected" and "transmitted" wave components of each of the S and P polarized waves, and is indicated by the beam paths 31 and 32 respectively. Thus, the "reflected waves" consist of a component of each of the S and P components of the original impinging wave incident on beam splitter 30, and the "transmitted waves" also consist of a component of each of the S and P components thereof.

Consider now only the path of the "reflected waves" 31 including both S and P polarized waves. The "reflected" S and P waves reflect off of beam splitter 30 toward mirror 40 which in turn directs the "reflected" S and P waves through a phase modulator 50 and impinges on a first terminating means 61 of an optical waveguide 60 through a focusing lens 70.

The S and P waves impinging upon first terminating means 61 propagate through waveguide 60 and emerge at second terminating means 62 of waveguide 60. The emerging "reflected" S and P waves are directed again toward beam splitter 30 through focusing lens 71 which in turn are reflected toward mirror 80, and in turn directs the "reflected" S and P waves toward polarizing beam splitter 90 which will be further described.

The path of the S and P waves transmitted through beam splitter 30 will now be described. The "transmitted" S and P waves 32 are directed toward second terminating means 62 of waveguide 60 through focusing lens 71. These waves propagate through waveguide 60 and emerge from first terminating means 61. The emerging "transmitted" S and P waves are directed toward mirror 40 through focusing lens 70 and phase modulator 50. In turn, the "transmitted" S and P waves reflect off of mirror 40 and are transmitted through beam splitter 30 toward mirror 80 which in turn are reflected toward polarizing beam splitter 90.

It is important to emphasize that the four (4) waves coexist in the wave paths just described, these four waves being "reflected" S and P waves, and "transmitted" S and P waves. Each of these four waves will respond independently to any rotation of waveguide 60 in accordance with Sagnac interferometer principles.

Note that portions of the "reflected" S and P waves emerging from lens 71 can be transmitted through beam splitter 30 toward optical isolator 20. Further, components of "transmitted" waves emerging from first terminating means 61 are reflected from beam splitter 30 toward optical isolator 20. The purpose of optical isolator 20 is to isolate these just referred to waves from the originating wave indicated by arrow 23 to prevent mixing of these waves with the originating wave impinging on beam splitter 30. Such optical isolators are well known in the art. It should be noted that an optical isolator is not required for practicing the principles of the invention.

Polarizing beam splitter 90 is an optical device well known in the art for separating S and P polarized waves. In FIG. 1, both "reflected" and "transmitted" components of the S polarized waves reflected off of mirror 80, indicated by arrow 95, are transmitted through polarizing beam splitter 90 toward a first sensing means 91 through a focusing lens 92, and both "reflected" and "transmitted" components of the P polarized waves reflected off of mirror 90, indicated by arrow 96, are reflected from polarizing beam splitter 90 toward detector 93 through focusing lens 94. The outputs of detector 91 and 93 are presented to Read Out Electronics 100 for signal processing. Read out electronics 100 provides an output signal related to any phase shift in any of the four waves while passing through waveguide 60 as will be further described.

The operation of the dual polarization interferometer of FIG. 1 will now be described with reference to FIG. 2 and FIG. 2a. First, in the description which follows, laser 10 is assumed to be a single mode linear polarization laser. In these circumstances, phase modulator device 50 can be provided by a quarter wave plate 51, followed by a Faraday cell 52, which, in turn, is followed by another quarter wave plate 53 as shown in FIG. 2a. The combination of elements 51, 52, and 53 are positioned in the path of the waves such that the "reflected" waves reflected from mirror 40 successively travel through quarter wave plate 51, Faraday cell 52, and quarter wave plate 53 and in turn impinge upon focusing lens 70, and the "transmitted" waves travel through said combination of elements in the reverse of as aforesaid. The combination of elements provide a non-reciprocal phase modulator.

Laser 10 can be rotated about its optical axis so that the single mode linear polarized wave emerging from laser 10 can be split into S and P polarized waves by beam splitter 30. FIG. 2 pictorially shows the "reflected" and "transmitted" S-polarized input waves for the system shown in FIG. 1 and assumes the use of the the non-reciprocal phase modulator shown in FIG. 2a for phase modulator 50, and is designated by numeral 50'. For the sake of clarity, waveguide 60 is redrawn and focusing lenses 70 and 71, and mirror 80 are omitted. Further, the S polarized component of the input wave resulting from beam splitter 30 is indicated in FIG. 2 by numeral 200, and is shown as two waves striking the surface of beam splitter 30 in order to facilitate explanation. In the following discussion the polarization states are those as they appear to the observer with the direction of propagation coming at the observer.

Figure 2:
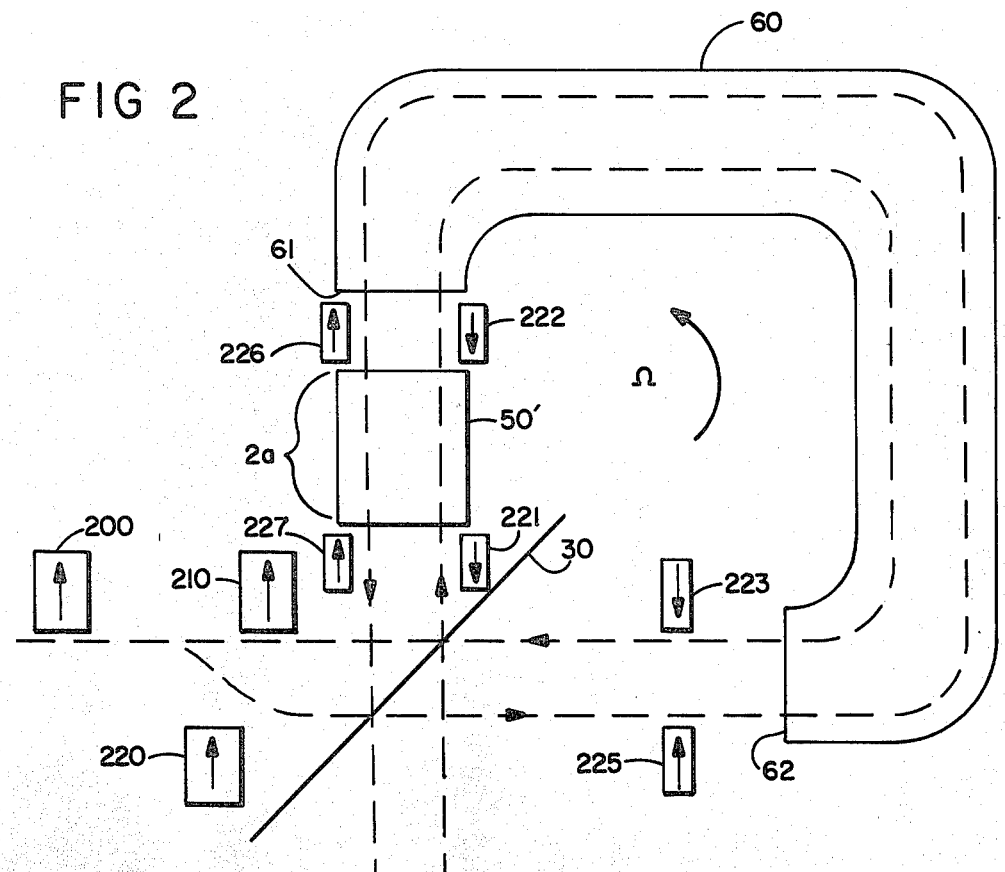
FIG. 2 is a diagrammatic representation of the operation of the interferometer of FIG. 1 in which the two waves are linearly polarized, but have opposite polarization states.
Figure 2A:
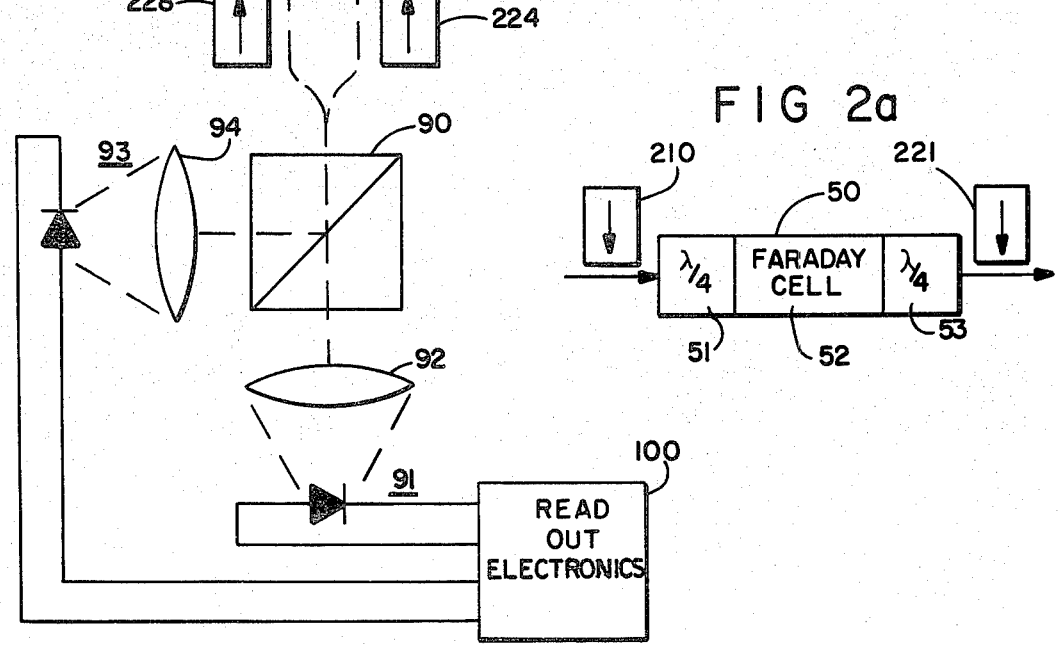
FIG. 2A is a diagrammatic representation of one type of a phase modulator.

Referring now to FIG. 2, the originating wave provided by laser source 10 is in line with the optical axis of the beam splitter 30 such as to divide the originating wave into S and P polarized light waves. FIG. 2 shows only the paths traveled by the "transmitted" and "reflected" components of the S-polarized light waves. For clarity, the "reflected" S-polarized light wave is indicated by numeral 210, and the "transmitted" S-polarized wave is indicated by numeral 220. The S-polarized component of the input wave 200 is divided at the beam splitter whose axis of polarization is such that the "reflected" wave 210 undergoes a 180° phase reversal indicated by numeral 221. The wave then passes through phase modulator 50' in the following manner. The reflected wave passes through the first quarter wave plate 51 becoming a right circularly polarized (RCP) wave which passes through the Faraday cell and undergoes a phase retardation, $(-I)$. In turn, the RCP wave passes through the second quarter wave plate 53 and returns the RCP wave to the same S-polarized wave as that which entered the first quarter wave plate 51 as indicated by numeral 222. This is a result of having the optical axis of the two quarter wave plates 51 and 53 rotated 90° with respect to each other. The S-polarized wave impinges upon the first terminating means 61 of waveguide 60 and propagates clockwise around the loop. Assuming a counterclockwise rotation of the loop $(\Omega)$, the Sagnac effect of phase retardation will retard the clockwise "reflected" S-polarized wave proportional to the rotation rate ($-\Omega$). The "reflected" wave travels through the waveguide and emerges from second terminating means 62, indicated by numeral 223. The wave indicated by numeral 223 again impinges upon beam splitter 30, is reflected, and accumulates another 180° phase change, as indicated by numeral 224. Wave 224 in turn is directed toward polarizing beam splitter 90 and is transmitted therethrough toward detector 91 as indicated in FIG. 1.

On the other hand, the "transmitted" component of the S-polarized wave is transmitted through beam splitter 30 without accumulating a phase change, indicated by numeral 225, and impinges upon terminating means 62. In the presence of a counterclockwise rotation of waveguide 60, the "transmitted" S-polarized wave picks up a Sagnac effect phase advance ($+\Omega$). This wave in turn emerges from first terminating means 61 and is directed toward phase modulator 50' and is indicated by numeral 226. Traveling through the quarter wave plate 53, wave 226 changes to an RCP wave. The output wave of quarter wave plate 53 passes through Faraday cell 52 and experiences a phase advance ($+I$). In turn, the wave passes through second quarter wave plate 51 and returns the RCP wave to the original linearly polarized wave which was transmitted through the beam splitter 30 as indicated by wave 227. This wave in turn is transmitted through beam splitter 30 without a phase reversal, indicated by numeral 228, and is directed toward polarizing beam splitter 90 and is transmitted therethrough toward detector 91, coexisting with the wave indicated by numeral 224.

To summarize, the S-polarized component of the impinging wave at the beam splitter 30 splits into "reflected" and "transmitted" S-polarized waves. Each of these waves pass through a non-reciprocal phase modulator 50' once but in opposite directions, and propagates in opposite directions through waveguide 60. In the presence of a counterclockwise rotation, the wave propagating in the counterclockwise direction (the "transmitted" wave) experiences a Sagnac phase advance, and the wave propagating in the clockwise direction (the "reflected" wave) experiences a Sagnac phase retard. In the presence of a clockwise rotation, the opposite effect, of course, occurs.

In the detector portion of the present invention, detector 91 essentially combines the counter-propagating "transmitted" and "reflected" S-polarized waves, numeral 228 and 224 in order to obtain an observable measurement of the phase difference between waves of same polarization, oppositely traveling through the waveguide. These waves essentially comprise a single polarization rate sensor containing rate information. The waves, when properly combined, form an interference pattern whose phase difference can be expressed as:

$$\Delta\phi_s = 2\Omega + 2I \tag{1}$$

Now consider, the operation of the interferometer with respect to the "reflected" and transmitted P-polarized waves. In a similar manner, the P-polarization wave component separated at the surface of beam splitter 30 also divides into a "reflected" and a "transmitted" components of the original P-polarized wave component. The waves experience similar Sagnac effects depending upon the direction of propagation through the waveguide but experience an opposite effect due to the non-reciprocal phase modulator 50'. That is to say that the clockwise traveling wave (the "reflected" P wave) experiences a phase advance through the Faraday cell and the counterclockwise wave (the transmitted P wave) experiences a phase retardation passing through the Faraday cell. Note, however, that the P-waves do not experience any phase reversal through the beam splitter. In a similar fashion to that already described, the clockwise and counterclockwise P-polarized waves are directed toward the polarizing beam splitter 90 which in turn are directed and combined at sensing means 93. At the sensing means 93, an interference pattern is created whose phase difference can be expressed as:

$$\Delta\phi_p = 2\Omega - 2I \tag{2}$$

As shown in FIG. 1, sensing means 91 and 93 may be, by way of example, photodetectors such as photodiodes for providing an indication of the intensity of the interference pattern created by the "reflected" and "transmitted" components of the first and second polarized waves at each of the detectors respectively. The output of each sensing means 91 and 93 are presented to readout electronics 100 for providing an output signal indicative of the rotation of the waveguide. In the present invention, readout electronics combines the outputs of sensing means 91 and sensing means 93 by determining the difference between intensity signals at each of the sensing means. The intensity at sensing means 91 and 93 may be represented by equations 3 and 4 respectively.

$$E1 = 1 - \cos[2\Omega + (2I + \delta\phi_1)] \tag{3}$$

$$E2 = 1 - \cos[2\Omega - (2I - \delta\phi_2)] \tag{4}$$

where
- $\Omega$ = Sagnac phase shift due to rotation,
- $I$ = phase shift introduced by the non-reciprocal phase modulator 50'
- $\delta\phi_1, \delta\phi_2$ = non-reciprocal waveguide effects, (in particular, fast and slow fiber polarizations of a fiber optic waveguide).

The difference between these intensities, E1 and E2, is determined by readout electronics 100 and can be expressed by equation 5.

$$E_2 - E_1 = \Delta E = \cos(2\Omega - (2I - \delta\phi_2)) - \cos(2\Omega + (2I + \delta\phi_1)) \tag{5}$$

The phase modulator term 2I can be assumed to be a constant, $I_o$, with a phase modulator instability expressed by a small time varying component $\Delta I$:

$$2I = I_o + \delta I \tag{6}$$

Substituting equation (6) into equation (5) and assuming $\delta I, \delta\phi_1$, and $\delta\phi_2$ are small, setting $I_o$ to the value of $\pi/2$ for optimized measurement sensitivity, and keeping terms only to second order yields:

$$\Delta E = (\delta\phi_1 + \delta\phi_2) + \tag{7}$$

$$4\Omega\left(1 + \tfrac{1}{2}\delta\phi^2 + \tfrac{1}{4}(\delta\phi_1^2 + \delta\phi_2^2) + \frac{\delta I}{2}(\delta\phi_1 - \delta\phi_2)\right)$$

Equation (7) indicates that the phase modulator instability, $\delta I$, enters as a first order scale factor error. In the prior art, the phase modulator instability enters as a discrete term.

Waveguide 60 can be implemented by an optical fiber known as a fiber optic waveguide which is well known in the art. The fiber is usually wound many times so that each loop encloses a finite area. The invention as so far described is not limited to a fiber optic waveguide and is equally applicable to semiconductor waveguides among others. Nonetheless, the following discussion assumes the use of fiber optic waveguide. The optical phase shift of the dual polarization interferometer of FIG. 1 determined by read out electronics 100 can be mathematically expressed by:

$$\Delta\phi = 2\Omega \left( \frac{4\pi LR}{\lambda c} \right) \left( 1 + \frac{\delta I^2}{2} \right) \quad (8)$$

where,
L = length of fiber, and
R = radius of a circularly wound fiber.
Equation (8) is a simplification of equation (7). An expression for a prior art Sagnac interferometer can be expressed by:

$$\Delta\phi = \Omega \left( \frac{4\pi LR}{\lambda c} \right) + \delta I \quad (9)$$

As can be seen by inspection and comparison of equations (8) and (9), the novel dual polarization interferometer rate sensor changes the effects of the modulator stability from a bias error to a scale factor error thus reducing the bias error effects in the output. To summarize the improvement of the dual polarization Sagnac interferometer, the dual polarization interferometer provides:

(i) an increase in scale factor by a factor of 2 over the prior art, and (ii) cancellation of phase modulator errors, i.e. no first order phase modulator error.

Note that the dual polarization interferometer of the present invention is not restricted only to angular rate sensors. The dual polarization interferometer can be used as simply an interferometer for a variety of applications. Use of the dual polarization interferometer can overcome a variety of system errors which can be circumvented. Also note that the dual polarization interferometer utilized as an angular rate sensor can be utilized with or without the phase modulator. Although the phase modulator can improve sensitivity, the dual polarization interferometer doubles the scale factor as aforesaid.

Note that the value of phase shift provided by the phase modulator is intended to cause maximum rate sensitivity. For linear polarized wave systems, the phase modulator could provide a constant phase shift of $\pi/4$ to all waves so that a phase difference of $\pi/2$ exists between the two waves of the same polarizaton counter-propagating along the waveguide. Note also that the phase modulator could be part of a closed-loop control system as practiced in the art of fiber optic interferometric rate sensors for continuously obtaining maximum sensitivity operation.

In the embodiments so far discussed, only linearly polarized waves were generated by the source which, in turn, impinged upon beam splitter 30 as indicated in FIG. 1. The dual polarization concept of the present invention was demonstrated and described above using linearly polarized waves with reference to FIGS. 1 and 2. The concepts of the present invention are equally applicable to a system utilizing circularly or elliptically polarized waves.

Figure 3:
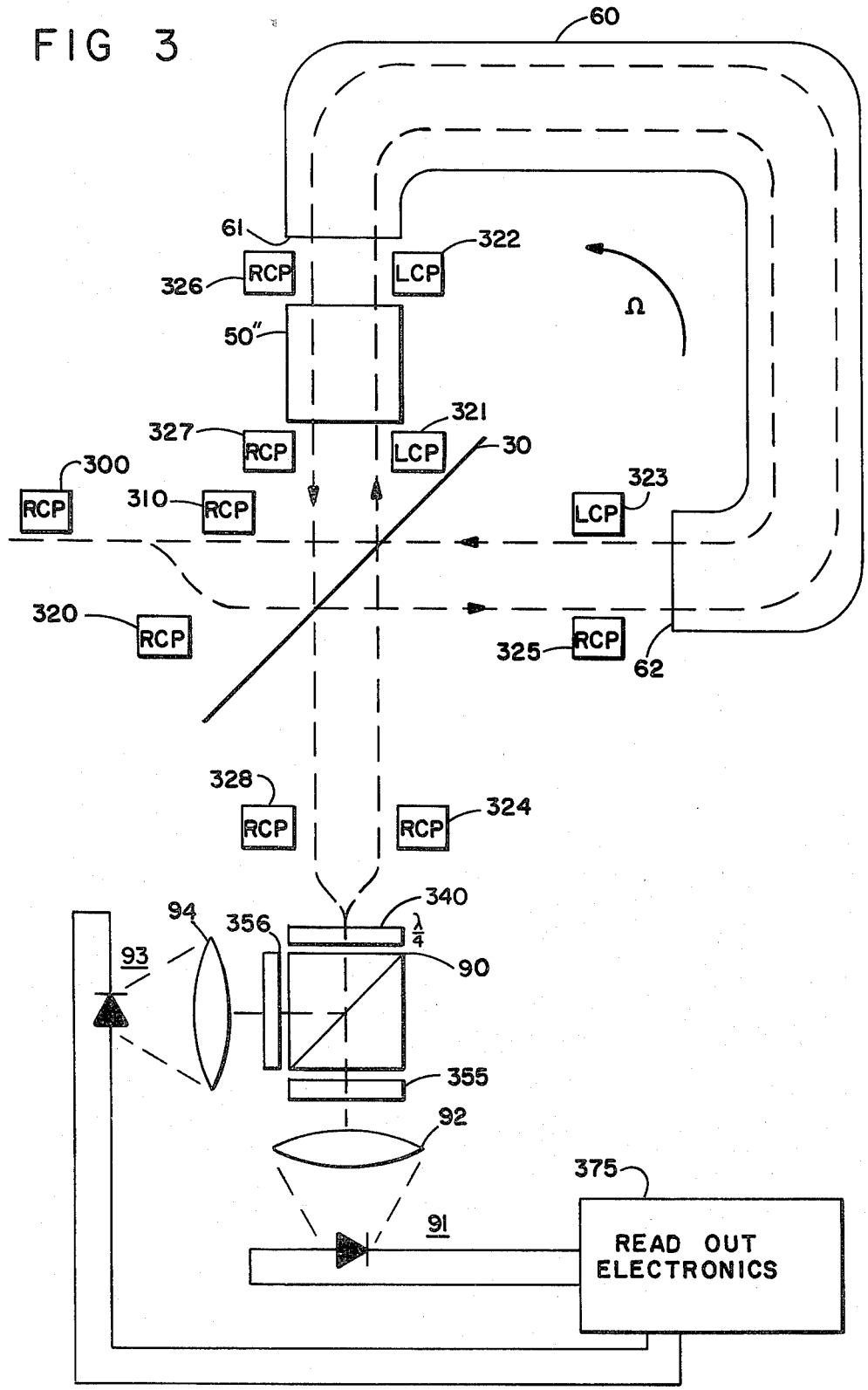
FIG. 3 is a diagrammatic representation of the operation of a modification of the interferometer shown in FIG. 1 in which the waves are circularly polarized.

Consider now the situation where the laser source 10 and optical isolator 20 are replaced by a laser source and appropriate polarization filtering devices which generates a wave consisting of right and left circularly polarized waves which are directed toward beam splitter 30 in a manner similar to that indicated in FIG. 1. Similar to the linearly polarized situation, beam splitter 30 will reflect both RCP and LCP waves and also pass or transmit through beam splitter 30 RCP and LCP waves. FIG. 3 pictorially describes "reflected" and "transmitted" RCP source generated waves impinging on beam splitter 30. The phase modulator 50 of FIG. 1 is indicated in FIG. 3 by numeral 50" and consists of only a Faraday cell which is a non-reciprocal phase modulating device. Like FIG. 2, for the sake of clarity, waveguide 60 is again redrawn and the focusing lenses 70 and 71, and mirror 80 are omitted. Further, the originating RCP polarized input wave generated by a laser source is indicated in FIG. 3 by numeral 300, and is shown as two RCP waves striking the surface of beam splitter 30 in order to facilitate explanation. Again, in the following discussion, the polarization states are those as they appear to the observer with the direction of the propagation coming at the observer.

Referring now to FIG. 3, only the paths traveled by the "transmitted" and "reflected" RCP waves are shown. For clarity, the "reflected" RCP wave component is indicated by numeral 310 and the "transmitted" RCP wave component is indicated by numeral 320. RCP wave 310 impinges on beam splitter 30, and is reflected therefrom with an additional 180° phase reversal changing the RCP wave to an LCP wave as indicated by numeral 321. The reflected wave passes through the phase modulator 50" and undergoes a phase advance (+I) as indicated by numeral 322. The LCP wave 322 impinges upon the first terminating means 61 of waveguide 60 and propagates clockwise around the loop. Assuming a counterclockwise rotation of the loop ($\Omega$), the Sagnac effect of phase retardation will retard the clockwise "reflected" LCP wave indicated by numeral 322, the phase retardation being proportional to the rotation rate. The wave indicated by numeral 322 travels through the waveguide and emerges therefrom at second terminating means 62, indicated by numeral 323. The wave indicated by numeral 323 again impinges upon beam splitter 30, is reflected, and accumulates another 180° phase reversal changing the LCP wave indicated by numeral 323 to the originating RCP polarized wave indicated by numeral 324. Wave 324 in turn is directed toward detector 91 through a quarter wave plate 340, polarized beam splitter 90, and polarization filter 355 and focusing lens 92.

In the situation where the circularly polarized waves propagate about waveguide 60, a quarter wave plate is inserted between beam splitter 30 and beam splitter 90 as indicated in FIG. 3. Further, polarization filters 355 and 356 are inserted between polarizing beam splitter 90 and focusing lenses 92 and 91 respectively. The explanation of these components will follow.

The path of a right circularly polarized wave which is transmitted through beam splitter 30 will now be described. The source wave 320 impinges upon beam splitter 30 and passes therethrough without any phase reversal as indicated by numeral 325, and impinges upon terminating means 62 of waveguide 60. In the presence of a counterclockwise rotation of the waveguide 60, the "transmitted" RCP polarized wave picks up a Sagnac effect phase advance (+Ω). This wave in turn emerges from terminating means 61 as directed toward the non-reciprocal phase modulator 50" and is indicated by numeral 326. The RCP wave indicated by numeral 326 passes through phase modulator 50" and experiences a phase advance. (Note that both propagating waves are phase advanced by the non-reciprocal phase modulator provided by the Faraday cell.) The wave out of phase modulator 50" is indicated by numeral 327. This wave in turn is transmitted through beam splitter 30 without a phase reversal indicated by numeral 328. The RCP wave indicated by numeral 328, like the RCP wave indicated by numeral 324, is directed toward detector 93 through quarter wave plate 340, through polarizing beam splitter 90, polarization filter 356, and focusing lens 93.

To summarize, the RCP wave generated by the laser source and associated polarizing optics, is both "reflected" and "transmitted" by beam splitter 30. Each of these waves passes through a non-reciprocal phase modulator 50' once, in opposite directions, and propagates in opposite directions through waveguide 60. Each of the propagating waves propagating through waveguide 60 in the presence of a rotation thereof will pick up a phase advance or retardation depending upon the direction of travel of the propagating wave in the direction of rotation as is well known.

As is so far described, the impinging left circularly polarized wave 300 impinging upon beam splitter 30 divides into counter-propagating "reflected" and "transmitted" waves which propagate through waveguide 60 and emerge from beam splitter 30 as designated by waves indicated by numerals 328 and 324. These waves, in actuality, coexist and are component parts of a single laser beam. They comprise a single polarization rate sensor containing rate information. The "reflected" RCP wave emerging from detector 30 toward detector 91 may be simplistically represented by:

$$RCP, +I, -\Omega \qquad (10)$$

and the "transmitted wave" emerging from beam splitter 30 may be simplistically represented as:

$$RCP, +I +\Omega \qquad (11)$$

where +I and Ω represent additive phase terms from the phase modulator 50" and the Sagnac effect.

The optical system comprising quarter wave plate 340, polarizing beam splitter 90, and polarizing filters 355 and 356 separate impinging RCP and LCP waves for detection by detectors 91 and 92. Quarter wave plate 340 converts RCP and LCP waves to S-polarized and P-polarized waves respectively. Polarizing beam splitter reflects P-polarized waves toward detector 93 through polarization filter 356 and focusing lens 94, and transmits S-polarized waves toward detector 91 through polarization filter 355 and focusing lens 92. Thus, in the situation pictorially described in FIG. 3, both RCP waves indicated by numeral 324 and 328 are converted to S-polarized waves by quarter wave plate 340, transmitted through polarizing beam splitter 90 and polarization filter 92, and impinge on detector 91. Similarly, both LCP waves are converted to P-polarized waves and directed to impinge on detector 93.

Other optical systems in addition to that just described can be used for directing the appropriate waves to impinge and be combined on designated detectors. The optical system just described is only illustrative of an example for achieving the intended purpose and is not intended to limit the scope of the invention.

Now consider the operation of the dual polarization interferometer with respect to left circularly polarized waves (LCP) provided by the laser source which impinges upon beam splitter 30 directed from the source. The surface of beam splitter 30 divides the LCP wave into a "reflected" and "transmitted" components of the original impinging left circularly polarized wave. The waves experience similar Sagnac effects as the right circularly polarized waves depending upon direction of propagation through the waveguide, but experience an opposite effect due to phase modulator 50". That is to say that each of the "reflected" and "transmitted" waves when passing through phase modulator 50" experience a phase retard of the same value as the phase advance imparted on the RCP waves passing therethrough. The "reflected" and "transmitted" LCP waves counter-propagate through waveguide 60 in a similar manner as that shown in FIG. 3 with respect to the RCP waves, and emerge from beam splitter 30 toward beam splitter 90. The "reflected" and "transmitted" LCP waves emerging from beam splitter 30 are converted to P-polarized waves by quarter wave plate 340, reflected from polarizing beam splitter 90 through polarization filter 356, and impinge on detector 93.

Thus, the impinging left circularly polarized wave impinging upon beam splitter 30 divides into counter-propagating "reflected" and "transmitted" waves which propagate through waveguide 60 and emerge from beam splitter 30. These waves, in actuality, also coexist and are component parts of another single laser beam. They comprise a second single polarization rate sensor containing rate information. The "reflected" LCP wave emerging from detector 30 toward detector 93 may be simplistically represented by:

$$LCP, -I -106 \qquad (12)$$

and the "transmitted wave" emerging from beam splitter 30 may be simplistically represented as:

$$LCP, -I +\Omega \qquad (13)$$

In summary, detectors 91 and 92 respond to RCP and LCP wave pairs of the counter-propagating waves respectively, effected by both the phase modulator 50" and the Sagnac effect due to rotation of the waveguide 60 in a manner similar to the linearly polarized waves already discussed with reference to FIGS. 1 and 2. Each detector responds to the variation in intensity of the combined counter-propagating waves of the same initial polarization before impinging on beam splitter 30 so as to provide information about the phase difference between the waves so combined.

The outputs of detectors 91 and 93 are compared by readout electronics 375 to provide an output that is proportional to:

$$\Omega \cos (I) \qquad (14)$$

The phase modulator 50" imparts a phase shift I of the same magnitude on each of the four (4) propagating waves (two RCP and two LCP). The value of I, the common phase modulating term of the simplistic representations of the four traveling waves indicated in equations (10), (11), (12), and (13), is provided in common to all of the waves via the phase modulator 50" comprising a Faraday cell in the example. The Faraday cell may be electrically controlled by an alternating polarity power source for varying the value of I. By modulating the value of I through at least two $\pi$ radians, the output root mean square (RMS) of equation (14) is then independent of the phase modulation and thus independent of any effects or errors caused by the phase modulator. Further, an additional advantage is provided in that the RMS signal output provided by the read out electronics 375 is proportional to the rotation rate.

In all of the analysis and description above, a constant intensity of the originating laser beams as well as equal intensities of the counter-propagating waves was assumed. In some circumstances, normalization of the counter-propagating waves may be required. This may be accomplished by use of the normalization technique mathematically described by $$(I1 - I2)/(I1 + I2)$$

where I1 is the intensity of some reference wave, and I2 is the intensity of the wave to be normalized. Thus, each of the counter-propagating waves can be normalized to eliminate errors due to variations in beam intensity.

The dual polarization Sagnac interferometer of the present invention provides cancellation of phase modulator errors as is common with interferometer rate sensors using phase modulators. The embodiments of the invention which were used to facilitate understanding of the invention should not be considered to limit the scope of the inventive principles. In particular, although prior art interferometer rate sensors have been predominantly fiber optic rate sensors, the waveguide, indicated by waveguide 60 in the figures, need not be a fiber optic waveguide for employing the principles of the invention. The waveguide can be provided by, among others, semiconductors, and may also be a waveguide defined by wave reflecting surfaces or mirrors.

Beam splitter 30, of course, provides simply the function of directing the two polarization waves and their respective components about the interferometer or waveguide means. Beam splitter 30 shown in FIG. 1 may be provided by a variety of components and systems including beam dividing mirrors or cubes having appropriate reflectivity coefficients. The beam splitting operation may also be provided by optical directional couplers known in the art. The type of electromagnetic waves employed, of course, determines the type of wave directing and/or splitting components required to obtain the intended function.

The phase modulator of FIGS. 1, 2, and 3 may be provided by a variety of systems for phase separating the four waves of the dual polarization interferometer. The phase shifting provided by the modulator may be selected to be fixed, adjustable, or vary in a time dependent mode. A Faraday cell is just one type of phase modulator which can provide the intended function. The magnitude and sign of the phase shift caused by the Faraday cell type of phase modulator can, of course, be controlled by an applied magnetic field. The sign of the phase shift being dependent upon the direction of the applied magnetic field and the direction of travel of the electromagnetic wave through the Faraday cell. The behavior of such systems is, of course, dependent upon the type of polarization of the electromagnetic waves, for example, linear or circular or elliptical.

The foregoing discussion was presented using electromagnetic waves in the form of laser beams. The present invention is not limited to laser beams or simply light beams of any specific variety. The present invention is applicable to any variety of polarized electromagnetic waves.

Obviously many modifications and variations of the present invention are possible in light of the above teachings. It is therefore, to be understood that within the scope of the dependent claims the invention may be practiced otherwise as specifically described.

The embodiments of the invention in which an exclusive property or right is claimed are defined as follows:

1. An angular rate sensor comprising:
waveguide means;
electromagnetic wave generating means capable of generating first and second electromagnetic waves having a common frequency and having first and second polarization states respectively, said electromagnetic wave generating means capable of directing
  (a) a first component of each of said first and second electromagnetic waves through said waveguide means in a first direction so as to travel through said waveguide means only once, said first components emerging from said waveguide means phase-shifted by a value related to the rate of rotation of said waveguide means, and
  (b) a second component of each of said first and second electromagnetic waves through said waveguide means in a second direction opposite to said first direction so as to travel through said waveguide means only once, said second components emerging from said waveguide means phase-shifted by a value related to the rate of rotation of said waveguide means; and
readout means, responsive, to said first and second components of each of said first and second electromagnetic waves emerging from said waveguide means phase-shifted by said rate of rotation of said waveguide means, for providing a signal indicative of the rate of rotation of said waveguide means.

2. An angular rate sensor comprising:
waveguide means;
phase modulating means capable of phase shifting by a selected value, having magnitude and sign, an electromagnetic wave traveling therethrough;
electromagnetic wave generating means capable of generating first and second electromagnetic waves having a common frequency and having first and second polarization states respectively,
  (a) said electromagnetic wave generating means capable of directing a first component of each of said first and second electromagnetic waves through said waveguide means and said phase modulating means such that
    (i) said first components thereof travel through said waveguide means in a first direction so as to travel through said waveguide means only once, and said first components emerging from said waveguide means phase-shifted by a value related to the rate of rotation of said waveguide means, and (ii) said first components thereof travel through said phase modulating means at least once so that said first component of said first wave is further phase-shifted by a first selected value having magnitude and sign, and said first component of said second wave is further phase-shifted by a second selected value having magnitude and sign, (b) said electromagnetic wave generating means capable of directing a second component of each of said first and second electromagnetic waves through said waveguide means and said phase modulating means such that (i) said second components thereof travel through said waveguide means in a second direction opposite to said first direction so as to travel through said waveguide means only once, said second components emerging from said waveguide means phase-shifted by a value related to the rate of rotation of said waveguide means, and (ii) said second components thereof travel through said phase modulating means at least once so that said second component of said first wave is further phase-shifted by a third selected value having magnitude and sign, and said second component of said second wave is further phase-shifted by a fourth selected value having magnitude and sign; and readout means, responsive to said first and second components of each of said first and second electromagnetic waves phase-shifted by said phase modulating means and said rate of rotation of said waveguide means, for providing a signal indicative of the rate of rotation of said waveguide means.

3. The apparatus of claim 2 wherein said magnitude of said first and third selected values of phase shift caused by said phase modulating means are substantially equal.

4. The apparatus of claim 3 wherein said magnitude of said second and fourth selected values of phase shift caused by said phase modulating means are substantially equal.

5. The apparatus of claim 2 wherein said magnitude of said first, second, third, and fourth selected values of phase shift caused by said phase modulating means are substantially equal.

6. The apparatus of claim 2, 3, 4 or 5 wherein said phase modulating means includes a Faraday cell.

7. The apparatus of claim 1 or 2 wherein said electromagnetic wave generating means includes a laser beam generating means for generating said first and second electromagnetic waves, and a beam splitter for directing said first and second components of said first and second electromagnetic waves.

8. The apparatus of claim 7 wherein said first and second electromagnetic waves are components of a single laser beam and wherein said first and second electromagnetic waves coexist in a single laser beam.

9. The apparatus of claim 1 or 2 wherein each of said first and second components of each of said first and second electromagnetic waves coexist in said waveguide means.

10. The apparatus of claim 1 or 2 wherein said waveguide means is provided by an optical fiber wound in such a manner so as to enclose a finite area, said optical fiber having first and second terminating means for the acceptance of waves into said waveguide means and for the emergence of waves from said waveguide means.

11. The apparatus of claim 1 wherein said readout means includes:

first signal means for providing an output signal indicative of the phase difference between said first and second components of said first electromagnetic wave phase-shifted by rotation of said waveguide means, second signal means for providing an output signal indicative of the phase difference between said first and second components of said second electromagnetic wave phase-shifted by rotation of said waveguide means, signal processing means responsive to said first and second signal means output signals for providing said readout means output signal related to said rate of rotation of said waveguide means.

12. The apparatus of claim 2 wherein said readout means includes:

first signal means for providing an output signal indicative of the phase difference between said first and second components of said first electromagnetic wave phase-shifted by rotation of said waveguide means and said phase modulating means;

second signal means for providing an output signal indicative of the phase difference between said first and second components of said second electromagnetic wave phase-shifted by rotation of said waveguide means and said phase modulating means;

signal processing means, responsive to said first and second signal means output signals for providing said readout means output signal related to said rate of rotation of said waveguide means.

13. The apparatus of claim 11 or 12 wherein said readout means includes at least one photodetector.

14. The apparatus of claim 1, 2, 11, or 12 wherein said first electromagnetic wave is an S-polarization wave and said second electromagnetic wave is a P-polarization wave.

15. The apparatus of claim 1, 2, 11, or 12 wherein said first electromagnetic wave is a right circularly polarized wave and said second electromagnetic wave is a left circularly polarized wave.

16. The apparatus of claim 12 wherein the difference between said first and third selected values of phase shift caused by said phase modulating means is substantially $\pm \pi/2$.

17. The apparatus of claim 16 wherein the difference between said second and fourth selected values of phase shift caused by said phase modulating means is substantially $\pm \pi/2$.

18. The apparatus of claim 12 wherein said first signal means output signal has the form:

$$2\Omega + 2I_1$$

and said second signal means output signal has the form $$2\Omega - 2I_2$$

where $\Omega$ is the phase shift resulting from the rotation rate of said waveguide means and $I_1$ is the resultant phase shift caused by said phase modulating means between said first and second components of said first polarized wave and $I_2$ is the resultant phase shift caused by said phase modulating means between said first and second components of said second polarized wave.

19. The apparatus of claim 12 or 18 wherein said signal processing means includes means for determining the difference between said first and second signal means output signals.

20. The apparatus of claim 12 wherein said magnitude of said first and third selected values of phase shift caused by said phase modulating means are substantially equal.

21. The apparatus of claim 12 wherein said magnitude of said second and fourth selected values of phase shift caused by said phase modulating means are substantially equal.

22. The apparatus of claim 12 wherein said phase modulating means includes a Faraday cell.

23. The apparatus of claim 11 or 12 wherein said wave source means includes a laser beam generating means.

24. The apparatus of claim 11 or 12 wherein said first and second electromagnetic waves are components of a single laser beam wherein said first and second electromagnetic waves coexist in a single laser beam.

25. The apparatus of claim 11 or 12 wherein each of said first and second components of each of said first and second electromagnetic waves coexist in said waveguide means.

26. The apparatus of claim 11 or 12 wherein said waveguide means is provided by an optical fiber wound in such a manner so as to enclose a finite area, said optical fiber having first and second terminating means for the acceptance of waves into said waveguide means and for the emergence of waves in said waveguide means.

27. An angular rate sensor comprising:
waveguide means having first and second terminating means adapted for the acceptance of coherent beams of light into said waveguide means and for the emergence of coherent beams of light from said waveguide means;
phase modulating means capable of phase shifting, by a selected value having magnitude and sign, an electromagnetic wave traveling therethrough;
coherent light source generating means capable of generating a beam of coherent light;
light directing means capable of receiving said beam of coherent light and splitting said beam of coherent light into a plurality of wave components thereof, of the same frequency, to travel in opposite directions along said waveguide means, said light directing means capable of
 (i) separating said received coherent beam of light into a first S and a first P polarized wave components, and a second S and a second P polarized wave component,
 (ii) directing said first S and P polarized wave components to impinge on said first terminating means of said waveguide means through said phase modulating means so as to travel through said waveguide means and emerge from said second terminating means thereof, said first S and P polarized wave components emerging from said second terminating means with a phase shift related to the rate of rotation of said waveguide means in addition to any phase shift caused by said phase modulating means, and
 (iii) directing said second S and P polarized wave components to impinge on said second terminating means of said waveguide means so as to travel through said waveguide means and emerge from said first terminating means thereof and successively travel through said phase modulating means and emerge therefrom, said second S and P wave components emerging from said phase modulating means with a phase shift related to the rate of rotation of said waveguide means in addition to any phase shift caused by said phase modulating means;
first detector means capable of providing an output signal indicative of the phase difference between said first S polarized wave component emerging from said waveguide means second terminating means and said second S polarized wave component emerging from said phase modulating means;
second detector means capable of providing an output signal indicative of the phase difference between said first P polarized wave component emerging from said waveguide means second terminating means and said second P polarized wave component emerging from said phase modulating means; and
signal processing means responsive to said first and second detector means output signals for providing an output signal which is a function of the rate of rotation of said waveguide means.

28. The apparatus of claim 27 wherein said phase modulating means includes a Faraday cell.

29. The apparatus of claim 2, 12 or 27 wherein said phase modulating means includes a first quarter wave plate, a non-reciprocal phase modulator, and a second quarter wave plate, for phase shifting said electromagnetic wave traveling therethrough, said non-reciprocal phase modulator located between said first and second quarter wave plates.

30. The apparatus of claim 27 wherein said waveguide means is provided by an optical fiber wound in such a manner so as to enclose a finite area, said optical fiber having said first and second terminating means.

31. The apparatus of claim 27 wherein said light directing means comprises a beam splitter.

32. The apparatus of claim 27 including a polarized beam splitter positioned in a manner such that said first S and P wave components emerging from said waveguide means second terminating means, and said second S and P wave components emerging from said phase modulating means impinge thereon, said polarized beam splitter capable of directing said impinging first and second S wave components to impinge on said first detector, and capable of directing said impinging first and second P polarized wave components to impinge on said second detector.

33. The apparatus of claim 31 further including optical isolator means positioned in the path between said coherent light source generating means and said beam splitter for isolating any waves emerging from said beam splitter toward said coherent light source generating means.

34. The apparatus of claim 27 wherein said phase modulating means is capable of phase shifting said first S polarized wave component a first selected value, said second S polarized wave component a second selected value, said first P polarized wave component a third selected value, and said second P polarized wave component a fourth selected value, each of said first, second, third, and fourth selected values having a magnitude and sign.

35. The apparatus of claim 34 wherein the difference of said first and third selected values is substantially $\pm\pi/2$.

36. The apparatus of claim 35 wherein the difference of said second and fourth selected values is substantially $\pm\pi/2$.

37. The apparatus of claim 27 wherein said phase modulating means is capable of providing a constant magnitude of said selected value such that said magnitude of each of said first, second, third and fourth values are substantially equal.

38. The apparatus of claim 27 wherein said coherent light source generating means is a laser beam generator, and said coherent beam of light is a laser beam.

39. The apparatus of claim 27 wherein said non-reciprocal phase modulator includes a Faraday cell.

40. The apparatus of claim 27 wherein said waveguide means is provided by an optical fiber wound in such a manner so as to enclose a finite area, said optical fiber having first and second terminating means for the acceptance of coherent beams of light into said waveguide means and for the emergence of coherent beams of light from said waveguide means.

41. The apparatus of claim 27 wherein said first detector means output signal has the form:

$$2\Omega + 2I_1$$

and said second detector means output signal has the form $$2\Omega - 2I_2$$

where $\Omega$ is the phase shift resulting from the rotation rate of said waveguide means and $I_1$ is the resultant phase shift caused by said phase modulating means between said first and second components of said first polarized wave and $I_2$ is the resultant phase shift caused by said phase modulating means between said first and second components of said second polarized wave.

42. The apparatus of claim 27 wherein each of said first and second detectors includes a photodetector.

43. An angular rate sensor comprising:
waveguide means having first and second terminating means adapted for the acceptance of coherent beams of light into said waveguide means and for the emergence of coherent beams of light from said waveguide means;
phase modulating means capable of phase shifting, by a selected value having magnitude and sign, an electromagnetic wave traveling therethrough;
coherent light source generating means capable of generating a coherent beam of light having components of the same frequency including a right (RCP) circularly polarized beam of coherent light and a left (LCP) circularly polarized beam of coherent light;
light directing means adapted to receive said right and left circularly polarized beams of coherent light and splitting each of said received beams of light into wave components to travel in opposite directions along said waveguide means, said light directing means capable of
  (i) separating said received right and left circularly polarized beam of coherent light input first RCP and first LCP polarized wave components and second RCP and LCP polarized wave components,
  (ii) directing said first RCP and LCP polarized wave components to impinge on said first terminating means of said waveguide means through said phase modulating means so as to travel through said waveguide means and emerge from said second terminating means thereof, said first RCP and LCP wave components emerging from said second terminating means with a phase shift related to the rate of rotation of said waveguide means in addition to any phase shift caused by said phase modulating means, and
  (iii) directing said second RCP and LCP polarized wave components to impinge on said second terminating means of said waveguide means so as to travel through said waveguide means and emerge from said first terminating means thereof, and successively travel through said phase modulating means and emerge therefrom, said second RCP and LCP wave components emerging from said phase modulating means with a phase shift related to the rate of rotation of said waveguide means in addition to any phase shift caused by said phase modulating means;
first detector means for providing an output signal indicative of the phase difference between said first RCP polarized wave component emerging from said waveguide second terminating means and said second RCP polarized wave component emerging from said phase modulating means;
second detector means providing an output signal indicative of the phase difference between said first LCP polarized wave component emerging from said waveguide means second terminating means and said second LCP polarized wave component emerging from said phase modulating means;
signal processing means combining said first and second detector output signals for providing an output signal related to said rate of rotation of said waveguide means.

44. The apparatus of claim 43 wherein said phase modulating means includes a Faraday cell.

45. The apparatus of claim 43 wherein said waveguide means is provided by an optical fiber wound in such a manner so as to enclose a finite area, said optical fiber having said first and second terminating means.

46. The apparatus of claim 43 wherein said light directing means comprises a beam splitter.

47. The apparatus of claim 43 including a polarized beam splitter positioned in a manner such that said first RCP and LCP polarized wave components emerging from said waveguide means second terminating means, and said second RCP and LCP polarized wave components emerging from said phase modulating means impinge thereon, and capable of directing said first RCP polarized wave component emerging from said waveguide means second terminating means and said second RCP polarized wave component emerging from said phase modulating means to impinge upon said first detector means, and directing said first LCP polarized wave component emerging from said waveguide means second terminating means and said second LCP polarized wave component emerging from said phase modulating means to impinge upon said second detector means.

48. The apparatus of claim 43 including:
a wave conversion means for converting said first RCP polarized wave component emerging from said waveguide means second terminating means and said RCP polarized wave component emerging from said phase modulating means to first and second waves of a first linear polarization, and converting said first LCP polarized wave component emerging from said waveguide means second terminating means and said second LCP polarized wave component emerging from said phase modulating means to first and second waves of a second linear polarization orthogonal to said first linear polarization;

a polarized beam splitter for directing said first and second waves of said first linear polarization to impinge upon said first detector, and for directing said first and second waves of said second linear polarization to impinge upon said second detector.

49. The apparatus of claim 48 wherein said wave conversion means comprises the quarter wave plate.

50. The apparatus of claim 48 wherein said phase modulating means includes a Faraday cell.

51. The apparatus of claim 43 wherein said phase modulating means is capable of phase shifting said first RCP polarized wave component a first selected value, said second RCP polarized wave component a second selected value, said first LCP polarized wave component a third selected value, and said second LCP polarized wave component a fourth selected value, each having a magnitude and sign.

52. The apparatus of claim 51 wherein said magnitude of said first and third selected values are substantially equal.

53. The apparatus of claim 51 wherein said magnitude of said second and fourth selected values are substantially equal.

54. The apparatus of claim 51 wherein said phase modulating means is capable of providing a constant magnitude of said selected value such that said magnitude of each of said first, second, third and fourth values are substantially equal.

55. The apparatus of claim 43 wherein said coherent light source generating means is a laser beam generator, and said coherent beam of light is a laser beam.

56. The apparatus of claim 2, 12, 27, or 43 wherein said phase modulating means is adapted to receive an electrical control signal for selectively controlling the magnitude of phase shifting of said electromagnetic waves traveling therethrough.

57. The apparatus of claim 43 wherein said waveguide means is provided by an optical fiber wound in such a manner so as to enclose a finite area, said optical fiber having first and second terminating means for the acceptance of coherent beams of light into said waveguide means and for the emergence of coherent beams of light from said waveguide means.

58. The apparatus of claim 43 wherein said signal processing means output signal has the form:

$$\Omega \cos I$$

where $\Omega$ is the phase shift resulting from the rotation rate of said waveguide means and $I$ is said magnitude of phase shift produced by said phase modulating means.

59. The apparatus of claim 43 wherein each of said first and second detectors includes a photodetector.

60. The apparatus of claim 43 wherein said phase modulating means is capable of varying said magnitude of phase shift in each of said first and second wave components of said right and left circularly polarized electromagnetic waves passing therethrough.

61. The apparatus of claim 60 wherein said phase modulating means is capable of periodically varying said magnitude of phase shift at least as great as $2\pi$ radians.

62. The apparatus of claim 2, 12, 34, or 51 wherein said magnitude of said first and third selected values of phase shift caused by said phase modulating means are substantially equal, and said sign of said first and third selected values of phase shift differ.

63. The apparatus of claim 62 wherein said magnitude of said second and fourth selected values of phase shift caused by said phase modulating means are substantially equal, and said sign of said second and fourth selected values differ.

64. The apparatus of claim 63 wherein said sign of said first and second selected values of phase shift caused by said phase modulating means differ.

65. An angular rate sensor comprising:

optical waveguide means having first and second terminating means adapted for the acceptance of coherent beams of light into said waveguide means and for the emergence of coherent beams of light from said waveguide means;

coherent light source generating means capable of generating a beam of coherent light;

beam splitting means capable of receiving said beam of coherent light and splitting said beam of coherent light into reflected S and P wave components and transmitted S and P wave components, having a common frequency said beam splitter being arranged in the optical path of said coherent beam of light and said reflected and transmitted wave components such that (i) said reflected S and P wave components successively travel through a first quarter wave plate, a non-reciprocal phase modulator, a second quarter wave plate, and said optical waveguide means, said reflected S and P waves emerging from said optical waveguide means second terminating means so as to impinge on said beam splitter and to reflect therefrom and to impinge upon a first detector means through a polarizing beam splitter, and (ii) said transmitted S and P wave components successively travel through said optical waveguide means in an opposite direction as said reflected S and P wave components and emerge from said first terminating means, said second quarter wave plate, said non-reciprocal phase modulator in an opposite direction as said reflected S and P wave components, and said first quarter wave plate, said S and P transmitted waves emerging from said first quarter wave plate so as to impinge on saidd beam splitter and to travel therethrough and to impinge upon a second detector means through said polarizing beam splitter;

said first detector means capable of providing an output signal indicative of the phase difference between said reflected S wave component emerging from said optical waveguide second terminating means and said transmitted S wave component emerging from said first quarter wave plate;

said second detector means capable of providing an output signal indicative of the phase difference between said reflected P wave component emerging from said optical waveguide means second terminating means and said transmitted P wave component emerging from said first quarter wave plate;

signal processing means responsive to said first and second detector means output signals for providing an output signal which is a function of the rate of rotation of said optical waveguide.

66. The apparatus of claim 65 wherein said optical waveguide means includes an optical fiber wound in such a manner so as to enclose a finite area, said optical fiber having said first and second terminating means.

67. The apparatus of claim 65 wherein said coherent light source generating means is a laser beam generator and said beam of coherent light is a linear polarized laser beam.

68. The apparatus of claim 65 wherein said beam splitting means is selected from a group comprising beam divider mirrors, beam splitting cubes, and optical directional couplers.

69. The apparatus of claim 65 wherein said non-reciprocal phase modulator includes Faraday cell capable of phase shifting, by a selected value, said reflected and transmitted S and P wave components traveling therethrough.

70. The apparatus of claim 69 wherein said Faraday cell, in response to an applied magnetic field, causes said phase shifting of each of said waves traveling therethrough by said selected value, the sign of said phase shift being dependent on the direction of travel through said Faraday cell.

71. The apparatus of claim 65 wherein said first detector means output signal has the form:

$$2\Omega + 2I_1$$

and said second detector means output signal has the form $$2\Omega - 2I_2$$

where $\Omega$ is the phase shift resulting from the rotation rate of said waveguide means and $I_1$ is the resultant phase shift caused by said phase modulating means between said reflected and transmitted S wave components, and $I_2$ at the resultant phase shift caused by said phase modulating means between said reflected and transmitted P wave components.

* * * * *